(12) United States Patent
Leibold

(10) Patent No.: US 6,178,378 B1
(45) Date of Patent: Jan. 23, 2001

(54) METHOD FOR OPERATING A NAVIGATION SYSTEM FOR MOTOR VEHICLES

(75) Inventor: Frank Leibold, Nauheim (DE)

(73) Assignee: General Motors Corporation, Detroit, MI (US)

(*) Notice: Under 35 U.S.C. 154(b), the term of this patent shall be extended for 0 days.

(21) Appl. No.: 09/302,502

(22) Filed: Apr. 30, 1999

(30) Foreign Application Priority Data

May 23, 1998 (DE) .............................................. 198 23 123

(51) Int. Cl.[7] .......................... G06F 165/00; G08G 1/123
(52) U.S. Cl. .......................... 701/202; 701/204; 701/209; 701/210; 340/994
(58) Field of Search .................................... 701/200, 202, 701/204, 208, 209, 210; 73/178 R; 340/988, 990, 994, 995

(56) References Cited

U.S. PATENT DOCUMENTS

| 5,724,243 | * | 3/1998 | Westerlage et al. | 701/204 |
| 5,774,827 | * | 6/1998 | Smith, Jr. et al. | 701/210 |
| 5,790,974 | * | 8/1998 | Tognazzini | 701/204 |
| 5,797,113 | * | 8/1998 | Kambe et al. | 701/210 |
| 5,842,146 | * | 11/1998 | Shishido | 701/210 |
| 5,892,463 | * | 4/1999 | Hikita et al. | 701/209 |
| 5,933,100 | * | 8/1999 | Golding | 701/208 |
| 6,006,159 | * | 12/1999 | Schmier et al. | 701/204 |
| 6,028,537 | * | 2/2000 | Suman et al. | 340/988 |

OTHER PUBLICATIONS

Japanese patent abstract A 2–107917.

* cited by examiner

*Primary Examiner*—Gary Chin
(74) *Attorney, Agent, or Firm*—Anthony Luke Simon

(57) ABSTRACT

A method of operating a navigation system for motor vehicles in which a location and a destination are entered through an input device and transmitted by mobile radio to a central navigation computer, and a travel route is transmitted to the mobile radio with inclusion of route network data and traffic-related additional information by the navigation computer, comprising the steps of: receiving the location, the destination and a desired arrival time at the input device; transmitting the location, the destination and the desired arrival time to the navigation computer; computing a trip starting time based on route network data and transportation traffic data; and outputting a trip start or wake-up call to one of (a) a mobile radio and (b) a telephone number for the purpose of communicating trip starting time for travel from the location to the destination.

5 Claims, 2 Drawing Sheets

METHOD FOR OPERATING A NAVIGATION SYSTEM FOR MOTOR VEHICLES

TECHNICAL FIELD

The invention pertains to a method of operating a navigation system for motor vehicles.

BACKGROUND OF THE INVENTION

Two fundamentally different navigation systems for motor vehicles are known in which, in the first case, all necessary map data are available on board the motor vehicle, and in the second case, a central navigation computer is used to request navigation data. The former solution has the disadvantage that the available data rapidly becomes obsolete and therefore does not always take current conditions into account. These navigation processes are not dealt with by the present invention.

In the case of the process under discussion here the user of the vehicle enters a starting point and a trip destination through an input device (mobile radio apparatus or terminal). As the starting point the vehicle position currently determined by a global positioning system may be adopted automatically. This data is transmitted by mobile radio to a central navigation computer. This is done by telephone call to an operator, verbally or by entering the data directly into the navigation computer at a terminal. The navigation computer determines a trip route thus assuring that this is done by using very current map data and including current traffic information (traffic jams, road barriers, construction sites, etc.). The determined trip route is transmitted to the mobile radio and represented by suitable means for outputting the travel route. Such a process is utilized, for example, in the apparatus according to DE 44 29 121 C1.

SUMMARY OF THE INVENTION

The objective of the invention is to develop further the process for operating a navigation system in such a way that the benefit to the user is increased without a significant added cost.

Not only the starting point and destination but additionally also the desired arrival time are entered and transmitted to the navigation computer. On the basis of these input data, the navigation computer can calculate the anticipated travel time including the current and/or predicted traffic situation and the anticipated weather conditions from which a necessary departure time is obtained.

Advantageously, according to one example, this invention provides a method of operating a navigation system for motor vehicles in which a location and a destination are entered through an input device and transmitted by mobile radio to a central navigation computer, and a travel route is transmitted to the mobile radio with inclusion of route network data and traffic-related additional information by the navigation computer, comprising the steps of: receiving the location, the destination and a desired arrival time at the input device; transmitting the location, the destination and the desired arrival time to the navigation computer; computing a trip starting time based on route network data and transportation traffic data; and outputting a trip start or wake-up call to one of (a) a mobile radio and (b) a telephone number for the purpose of communicating the trip starting time for travel from the location to the destination.

BRIEF DESCRIPTION OF THE DRAWINGS

The present invention will now be described by way of example with reference to the following drawings in which.

DESCRIPTION OF THE PREFERRED EMBODIMENT

Figure 1:
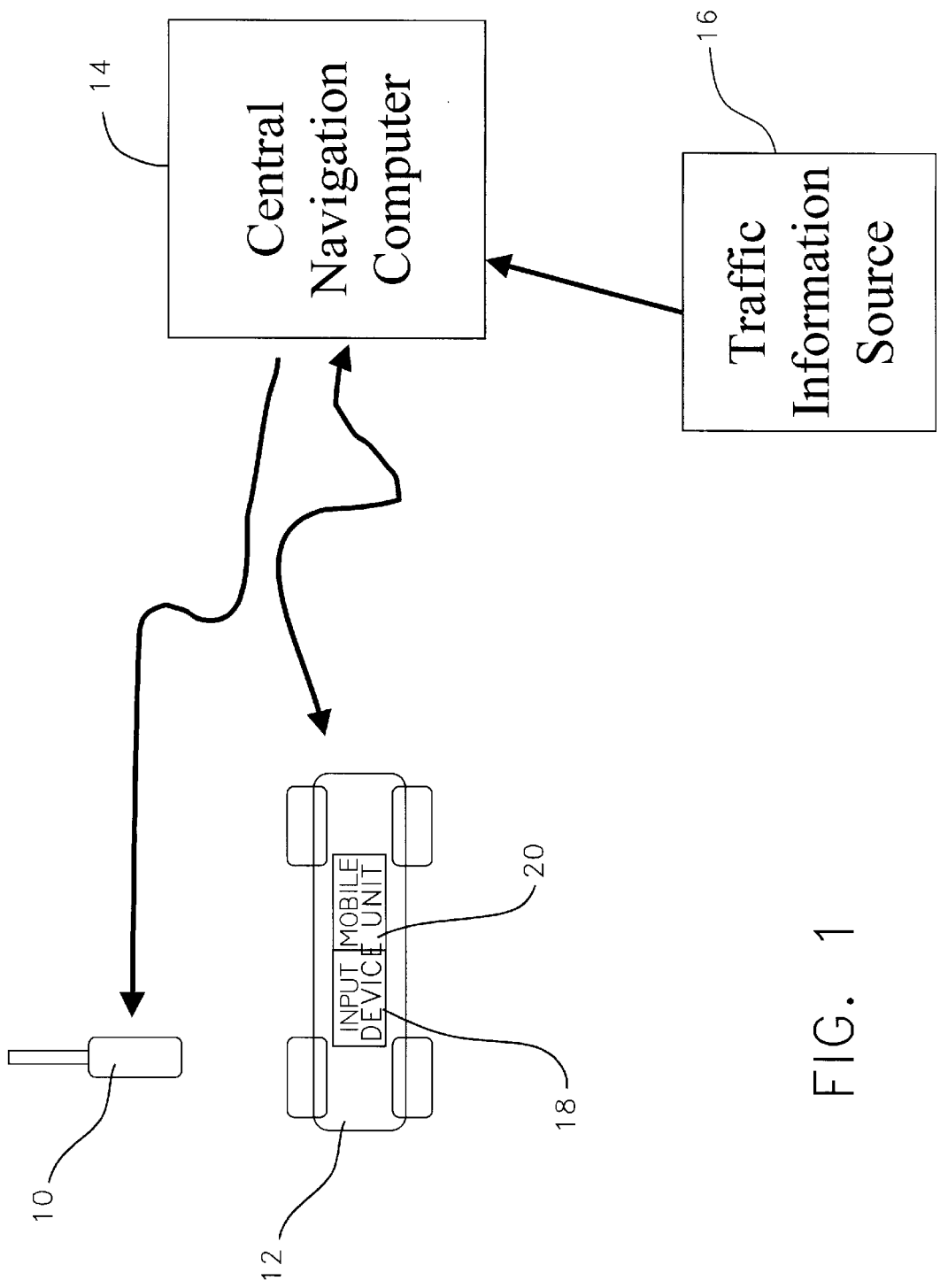
FIG. 1 illustrates an example system using the method of this invention.

FIG. 1 illustrates schematically example operation of a navigation system for motor vehicles. An input device 18 is located preferably as part of a mobile unit 20 in a vehicle 12, and is used to enter data identifying the present location, a desired destination and desired destination arrival time. The input device 18 transmits the received data to a central navigation computer such as of the type presently in commercial use, but modified to include the added functions described herein. The input device 18 may be any form of suitable input device for receiving and transmitting data. For example the input device 18 may include a cellular telephone allowing a user, by voice or key-operated menu, to communicate to the central navigation computer center the travel location and destination data. Alternatively, the input device 18 may be an in-vehicle mobile unit 20 in which travel location and destination data are entered through a keyboard or touch screen display, and then automatically transmitted to the central navigation computer 14.

The central navigation computer 14 processes the location and destination data and determines a travel route to the desired destination. The travel route is transmitted to the mobile unit 18 radio with inclusion of route traffic-related additional information. The central navigation computer 14 also computes a trip starting time based on route network data and transportation traffic data and sends a trip start or wake-up call to the mobile unit 20, or the hand-held unit 10. Mobile unit 20 and hand-held unit 10 are each capable of receiving the wake-up call in the format implemented for the specific system. The wake-up call may be in the form of a radio signal, for example, that is digitally encoded, or may be in the form of a telephone call automatically dialed to the telephone number for the hand-held unit 10, the mobile unit 20 or another telephone (either conventional or cellular) specified by the user.

The trip start or wakeup call suggests to the user time to begin travel. The trip start or wake-up call may occur at the time to begin travel, or at a fixed time before travel, in which case the start or wake-up call indicates the time of or time until beginning of travel. Alternatively, the trip start or wake-up call may be provided prior to the trip beginning time by a number of minutes or hours specified by the user. Also a combination of these options may be used.

In one example, the central navigation computer includes data on public transportation systems, such as bus routes, train schedules and airline schedules, including updated information on delays and cancellations. In this case, the connections to public transportation, i.e., the specified bus, train and/or air departures and arrivals, are included as part of the data specified at input device 18 and included in the transportation route computed by the central navigation computer 14. Central navigation computer 14 also accounts for connections to public transportation when factoring in the trip start or wake-up call time.

In another example, when the central navigation computer computes travel time and therefore the trip start or wake-up call time, it takes into account existing traffic information and also predicted traffic information, for example based upon daily and weekly traffic patterns, and also based upon weather patterns. For example a trip through the city that takes 30 minutes in light traffic can be assumed to take more time during evening rush hour, more time during rain and much more time during snow. Traffic pattern assumptions and specific multipliers for use in making predictions will very from location to location based upon statistical data and traffic reports.

Figure 2:
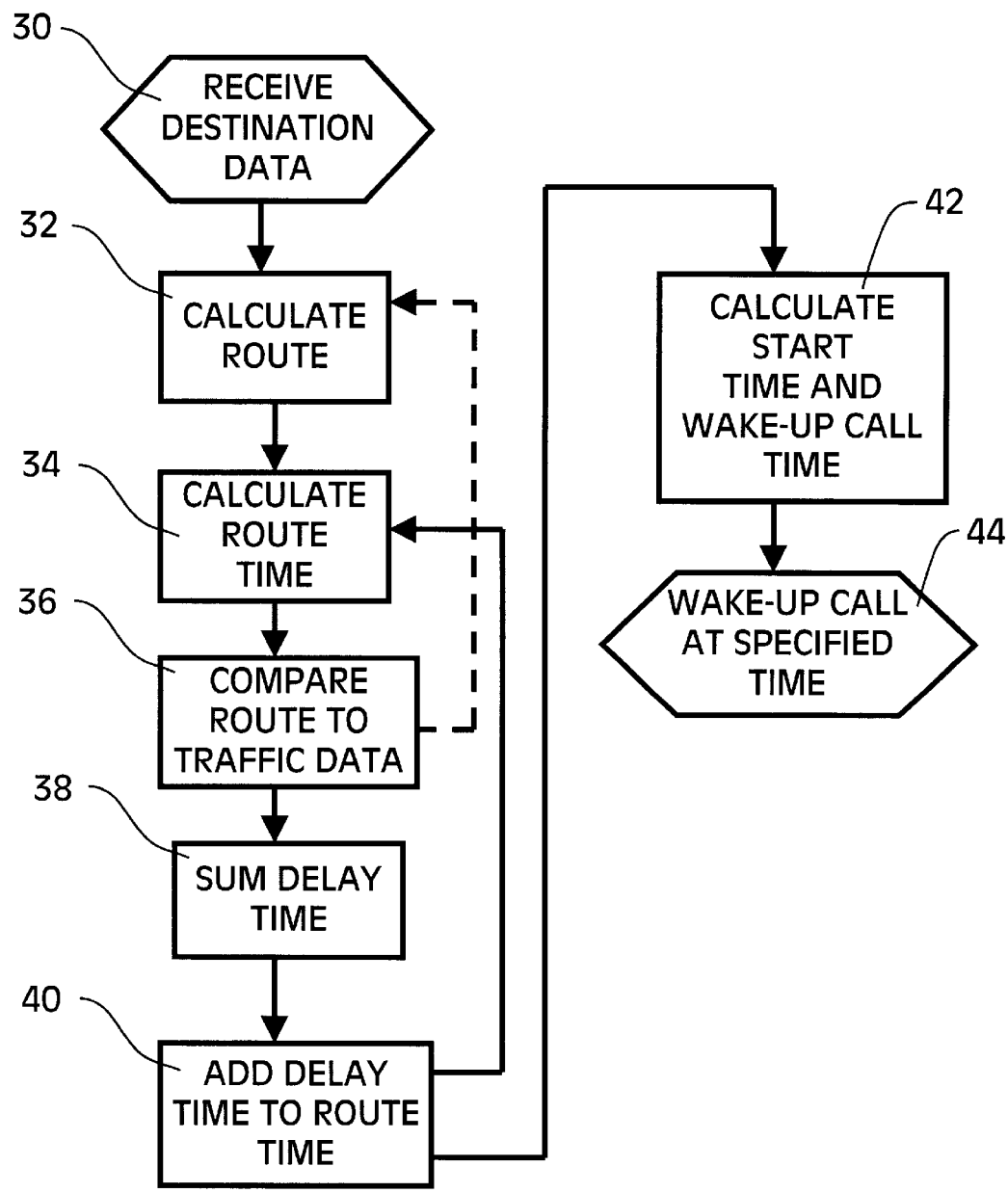
FIG. 2 illustrates an example method according to this invention.

Referring now also to FIG. 2, an example method according to this invention begins at step 30, where the data containing the location, desired destination and desired arrival time is received and transmitted to the central navigation computer 14. At step 32, the central navigation computer 14 calculates the travel route in the form of street directions and connections and other data typically computed for use with navigation systems. The central navigation computer calculates the route time at step 34 based on statistical information of traffic patterns and known speed limits.

At step 36 the central navigation computer 14 compares the route calculated at step 34 to traffic data obtained from a suitable traffic information source 16 (FIG. 1). The traffic information source 16 may be a remote computerized traffic information data base accessed through data communications channels, or may be a locally maintained data base updated by personnel at the central navigation computer station. Based upon the traffic data, step 38 sums the delays expected because of traffic, and step 40 adds the delays determined at step 38 to the computed route time determined at step 34.

If the system includes information on public transportation and weather, then the public transportation is included as part of the calculated route at step 32 and route time at step 34. Public transportation delays and cancellations and weather are accounted for when determining the delay time at step 38.

Step 42 calculates the start time and wake-up call time based upon the desired arrival time and the result of block 40. Block 44 outputs the wakeup call at the specified time as determined at block 42.

Steps 34–40 are performed on a continuous or frequent basis until the wake-up call is finally sent off. This allows the system to update the travel time, and also the time for determining the wake-up call, either on a frequent basis (for example, every 15 minutes) or whenever new data of traffic, weather, etc., arises.

Additionally, when the route traffic data at block 36 indicates traffic jam delays, the system may repeat steps 32–36 to calculate one or more alternative routes. Then the route with the least amount of route time and delays is selected at block 40.

Depending on this departure time the navigation computer transmits a starting call or a wake-up call to the mobile radio or to a telephone subscriber number specified for said call (e.g., a private telephone number of the vehicle user). It is advantageous if the trip-starting call or the wake-up call takes place at a specified time before the calculated necessary departure time. The selection of this time arrival can also be made when inputting the destination and the arrival time. Thus the navigation system which is operated by the process according to the invention has an additional functionality without the creation of additional costs for the system user. The user may be certain that he will complete his trip on time with consideration of all predictable circumstances, given that the transmitted navigation data (travel route) are available to him as is customary.

If a certain connection with a public transportation means is the destination, the process is also of advantage if current disturbances in operation of said transportation means are included concerning which information must be available to the navigation computer. If, for example, a certain flight connection at a certain airport is stated as the destination the navigation computer will check, on the one hand, whether the flight will start on time. If not, the corrected departure time minus a variable time for the transportation means will be planned in as the arrival time and calculated back from there to the trip starting time. The starting call or wake-up call then takes place accordingly and unnecessary waiting times at the airport may be avoided.

With the possibilities available to the individual the planning of the trip often involves errors because of the existing uncertainties. With the process according to the invention, part of the planning of the trip is taken over by the central navigation computer, such that the central navigation computer can employ clearly broader and more current information sources than is possible for the individual. The conventional navigation devices can be used for this process without additional instrument costs.

What is claimed is:

1. A method of operating a navigation system for motor vehicles in which a location and a destination are entered through an input device and transmitted by mobile radio to a central navigation computer, and a travel route is transmitted to the mobile radio with inclusion of route network data and traffic-related additional information by the navigation computer, comprising the steps of:

receiving the location, the destination and a desired arrival time at the input device;

transmitting the location, the destination and the desired arrival time to the navigation computer;

computing a trip starting time based on route network data and transportation traffic data; and outputting a trip start or wake-up call to at least one of (a) the mobile radio, (b) a telephone number, and (c) an additional radio unit for the purpose of communicating trip starting time for travel from the location to the destination.

2. A method of operating a navigation system for motor vehicles according to claim 1, wherein the trip start or wake-up call is made a predetermined time before the trip starting time.

3. A method of operating a navigation system for motor vehicles according to claim 1, wherein connections to public transportation means are also entered at the input device, and wherein current problems in the operation of said public transportation means are included in the determination of the time of the trip start or wake-up call.

4. A method of operating a navigation system for motor vehicles according to claim 1, wherein the central navigation computer when calculating the trip starting time makes use of current and predicted traffic information and weather expected during the trip.

5. A method of operating a navigation system for motor vehicles according to claim 1, wherein the input device is one of (a) the mobile radio or telephone and through it the input information for the navigation computer is transmitted verbally, and (b) a terminal from which the input information is transmitted directly as data to the navigation computer.

* * * * *